US009896036B2

(12) United States Patent
Baxter, Jr.

(10) Patent No.: US 9,896,036 B2
(45) Date of Patent: Feb. 20, 2018

(54) METHOD AND APPARATUS FOR THE TRANSPORTATION OF SPORTING AND RECREATIONAL EQUIPMENT ON A VEHICLE

(71) Applicant: Robert C. Baxter, Jr., Largo, FL (US)

(72) Inventor: Robert C. Baxter, Jr., Largo, FL (US)

( * ) Notice: Subject to any disclaimer, the term of this patent is extended or adjusted under 35 U.S.C. 154(b) by 0 days.

(21) Appl. No.: 15/078,195

(22) Filed: Mar. 23, 2016

(65) Prior Publication Data

US 2016/0280114 A1    Sep. 29, 2016

Related U.S. Application Data

(60) Provisional application No. 62/138,552, filed on Mar. 26, 2015.

(51) Int. Cl.
  *B60R 9/042*  (2006.01)
  *B60R 9/08*   (2006.01)
  *B60P 3/10*   (2006.01)

(52) U.S. Cl.
  CPC .......... *B60R 9/08* (2013.01); *B60R 9/042* (2013.01); *B60P 3/1025* (2013.01)

(58) Field of Classification Search
  CPC .. B60S 13/02; B60P 3/07; B60P 3/122; B60P 3/1025; B60P 3/1058; B60P 3/1008; B60P 3/062; B60P 1/6454; B60D 47/005; B60R 9/08; B60R 9/042
  USPC .......................................................... 410/1
  See application file for complete search history.

(56) References Cited

U.S. PATENT DOCUMENTS

| 3,604,579 | A | * | 9/1971 | Jenkins ............... | B60P 3/062 414/482 |
| 3,608,758 | A | * | 9/1971 | Dolbin ................ | B60P 3/1008 414/462 |
| 3,720,336 | A | * | 3/1973 | Murray ............... | B60P 3/07 298/8 R |
| 3,757,972 | A | * | 9/1973 | Martin ................ | B60P 3/062 414/462 |
| 5,232,329 | A | * | 8/1993 | Livingston .......... | B60P 1/54 414/462 |
| 5,393,191 | A | * | 2/1995 | Alexander .......... | B60P 3/062 414/477 |
| 5,556,249 | A | * | 9/1996 | Heine ................. | B60P 1/6454 414/477 |
| 5,622,299 | A | * | 4/1997 | Berard ................ | B60P 3/062 224/281 |
| 5,853,279 | A | * | 12/1998 | Neugebauer ........ | B60P 3/122 414/462 |
| 5,879,123 | A | * | 3/1999 | Blaikie ............... | B60P 3/07 104/47 |
| 6,086,082 | A | * | 7/2000 | Andol ................. | B60P 3/062 150/166 |
| 6,413,033 | B1 | * | 7/2002 | Monroig, Jr. ....... | B60P 3/122 414/462 |

(Continued)

*Primary Examiner* — Mark C Hageman
(74) *Attorney, Agent, or Firm* — Z IP Law PLLC; Claire Zopf

(57) ABSTRACT

An equipment carrier for sporting and recreational equipment that attaches to a loading surface such as a roof or truck bed of a vehicle and more specifically to the design and operation of an equipment carrier having a motorized winch, gridded platform, and rotating disk that provides for electrically raising and lowering the sporting equipment onto and off of a vehicle for transport.

20 Claims, 22 Drawing Sheets

(56) References Cited

U.S. PATENT DOCUMENTS 6,524,056 B1 * 2/2003 Kloster ................ B60P 3/122
 224/571
7,427,183 B2 * 9/2008 Stabeno ................ B60P 3/122
 414/482

* cited by examiner

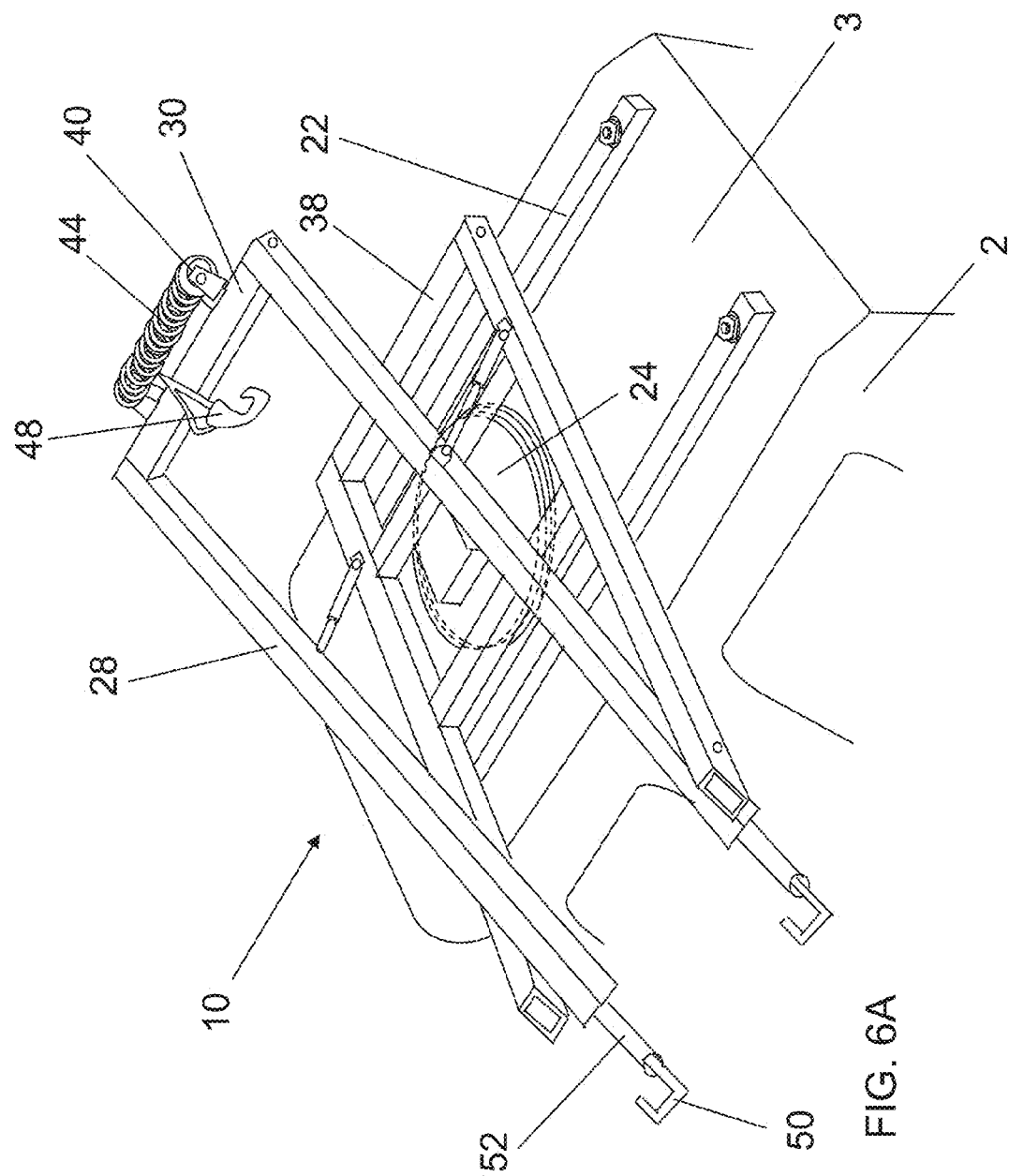

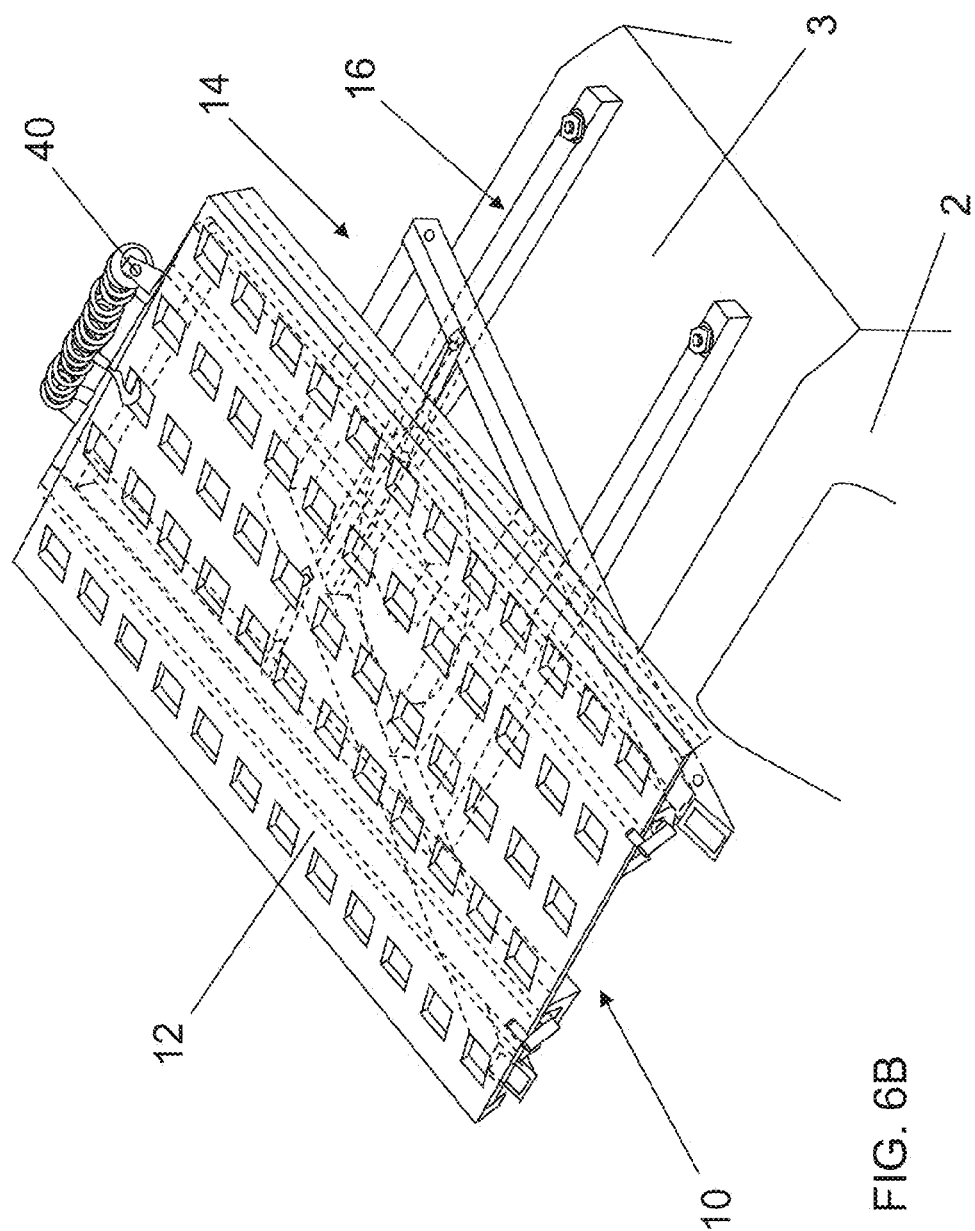

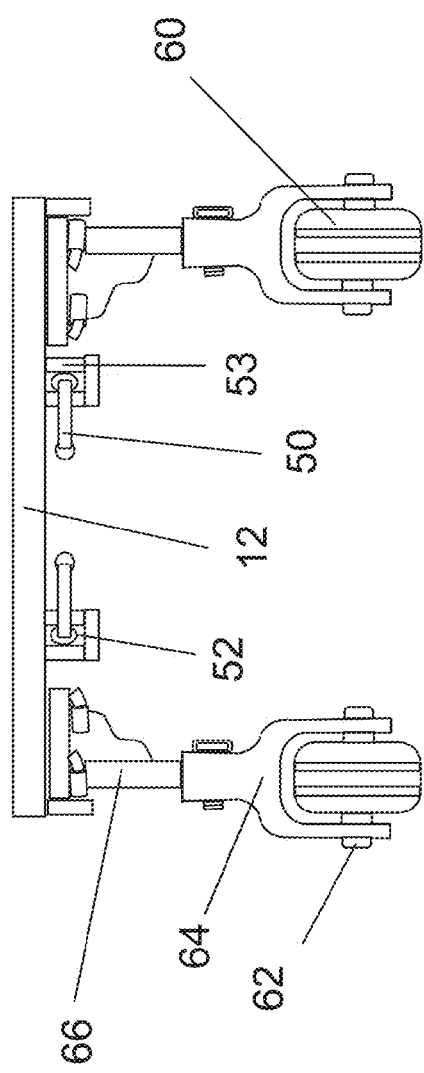
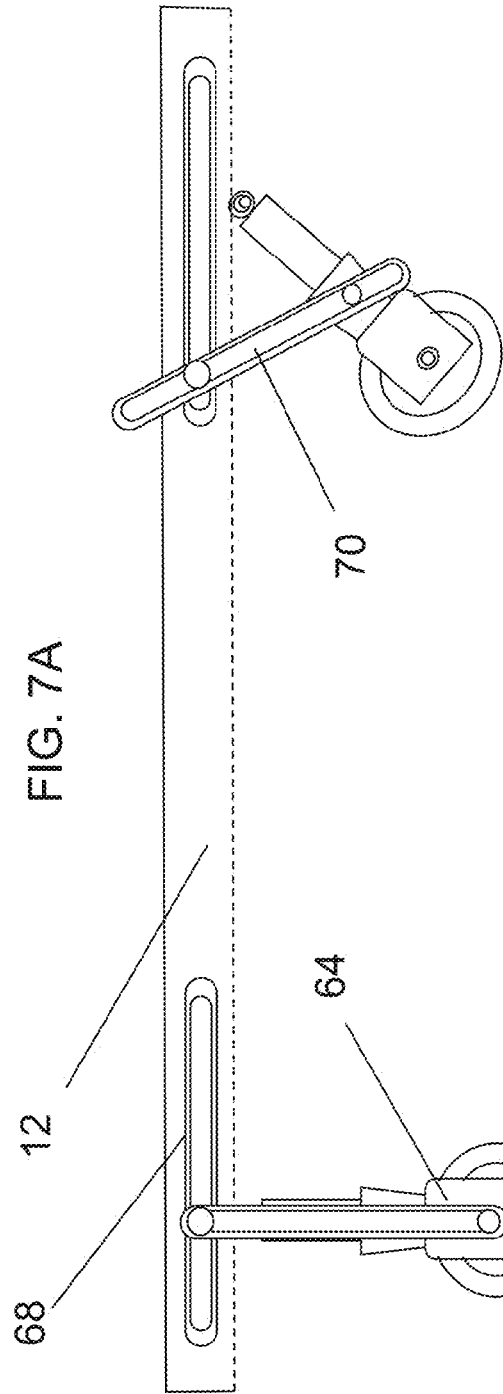
FIG. 7A
FIG. 7B

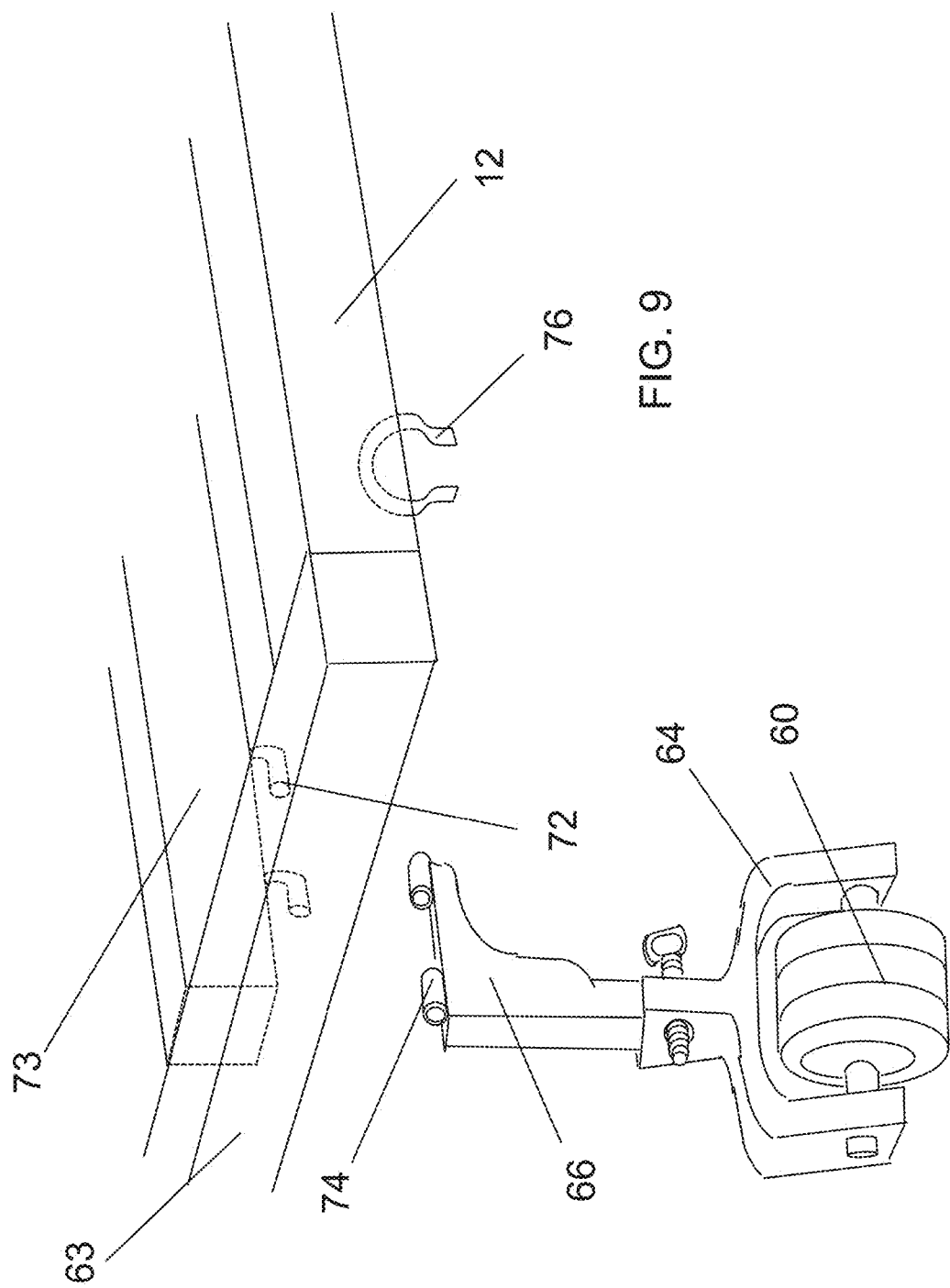

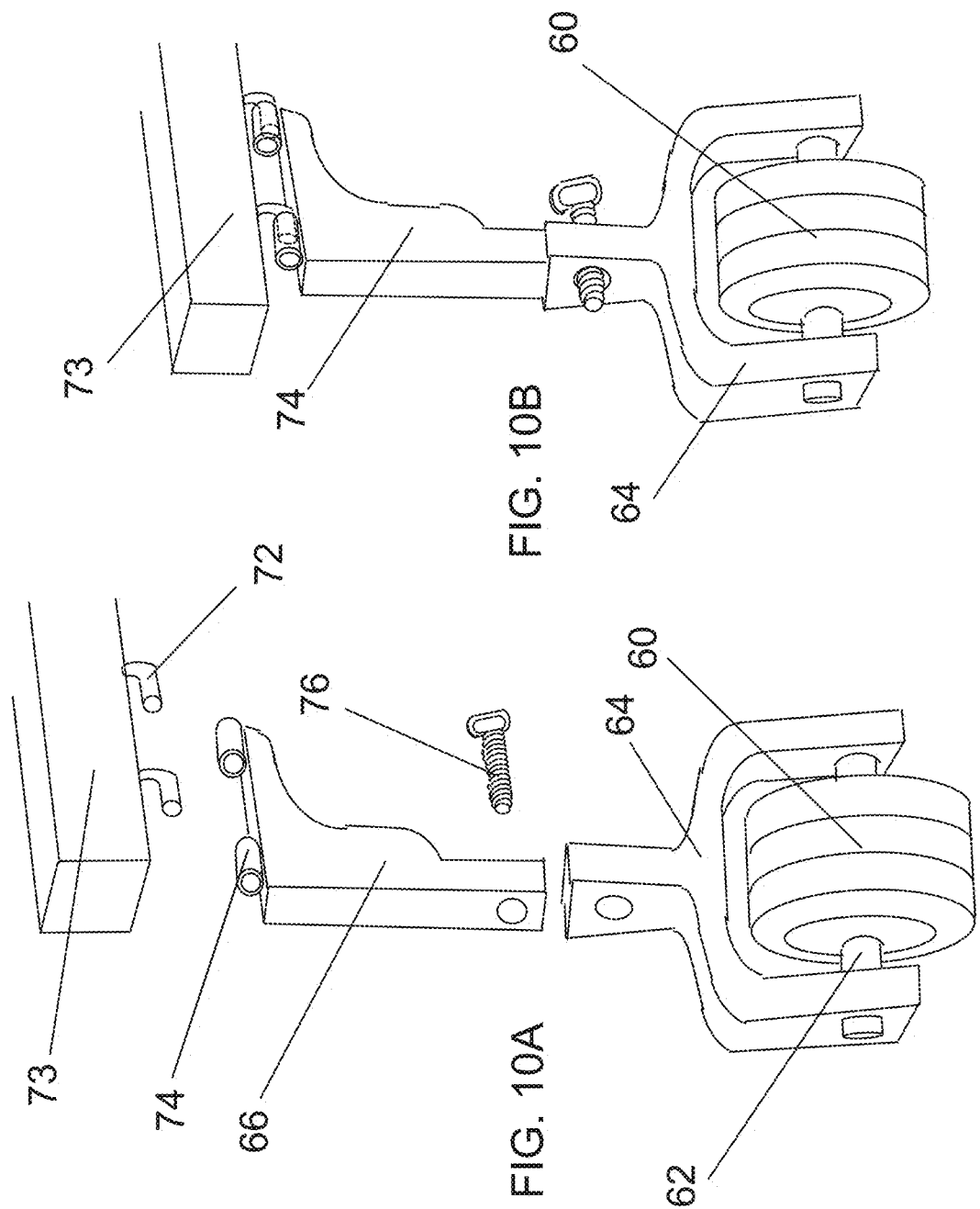

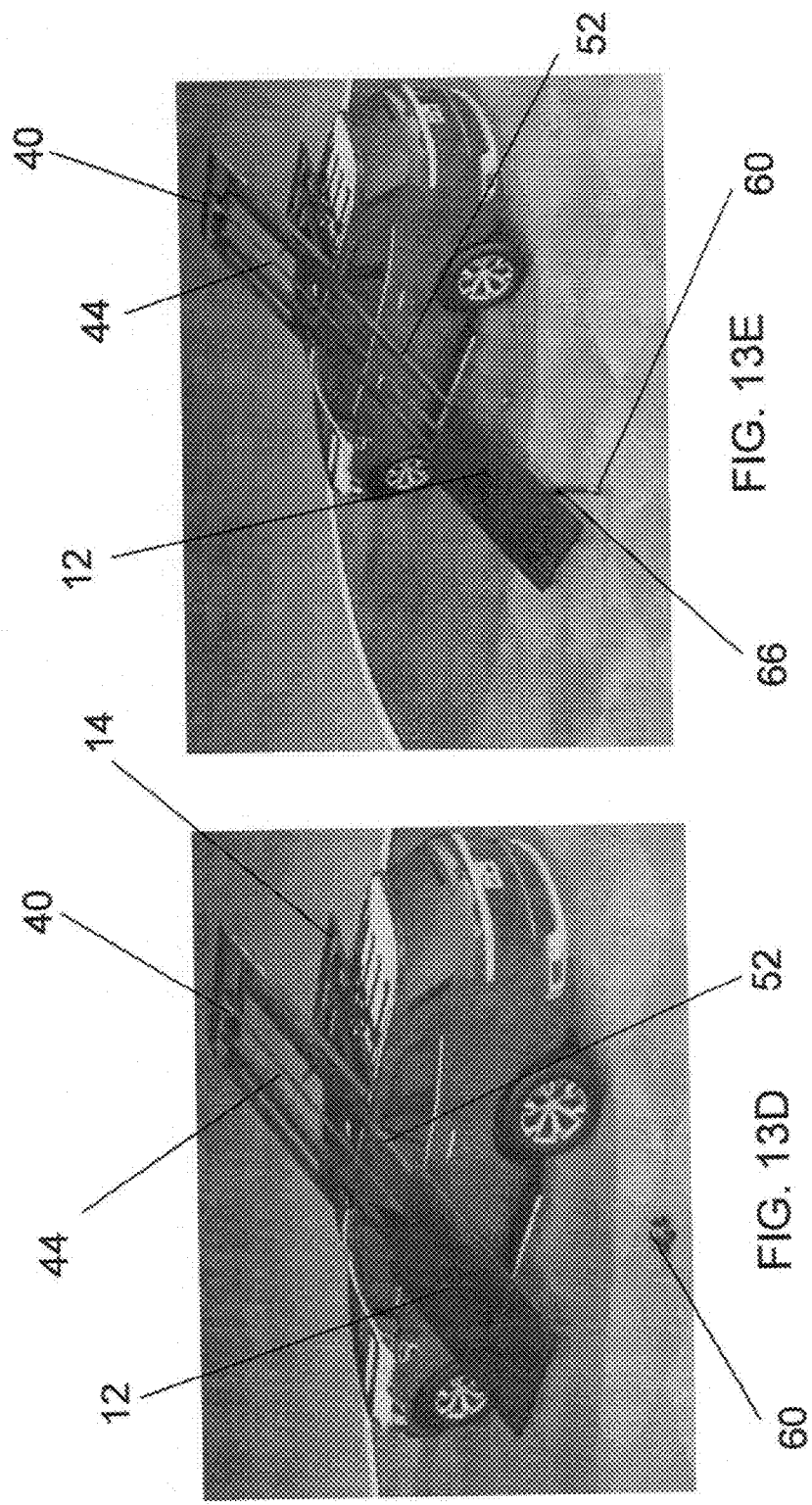

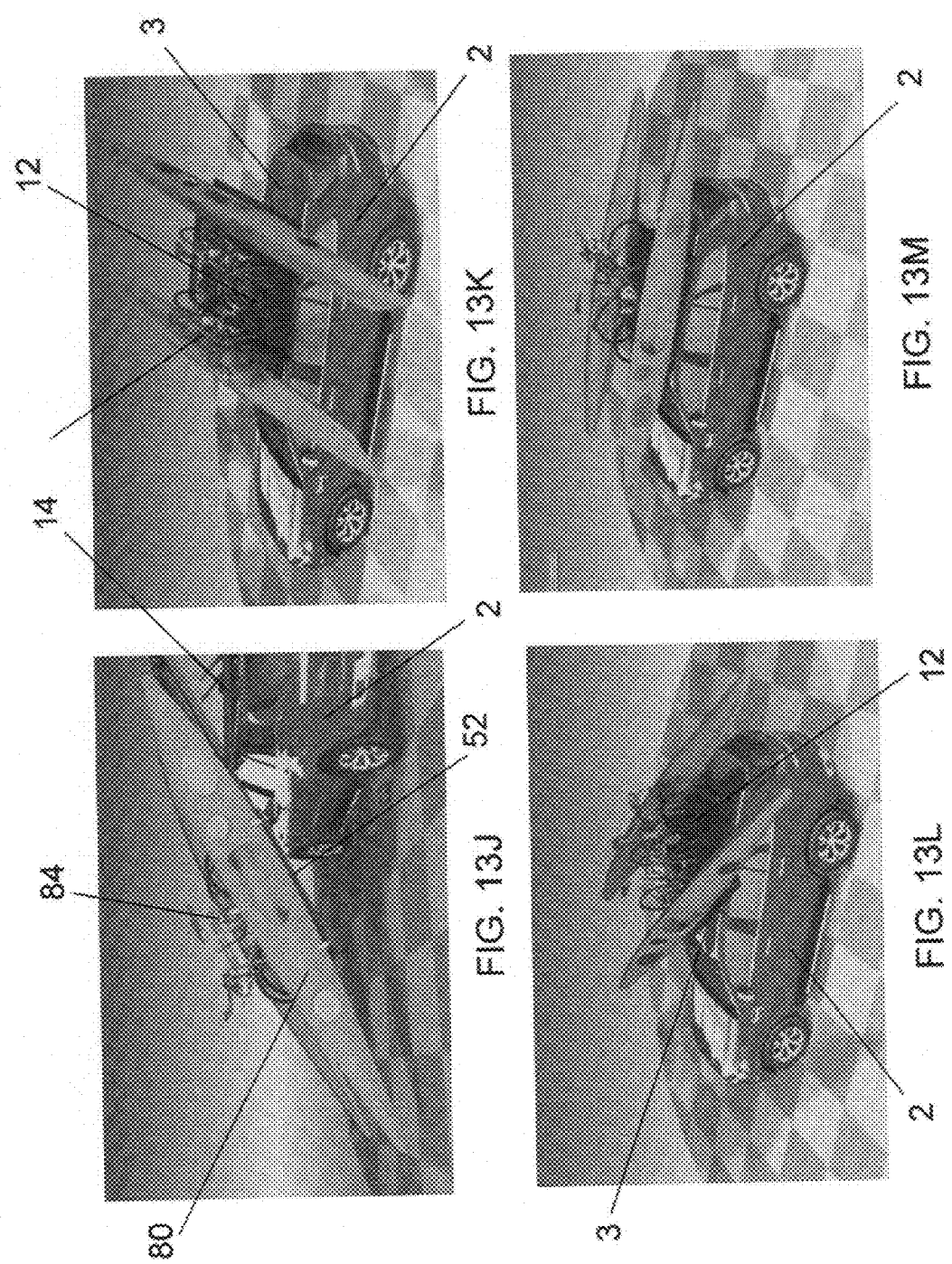

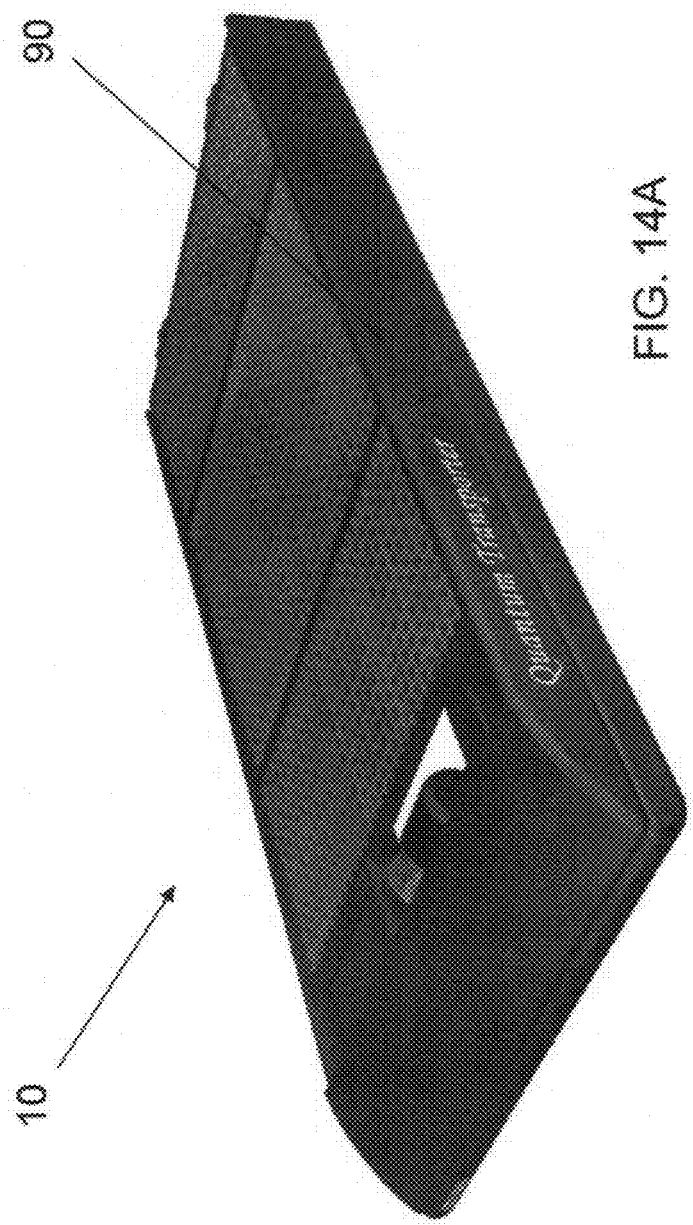

METHOD AND APPARATUS FOR THE TRANSPORTATION OF SPORTING AND RECREATIONAL EQUIPMENT ON A VEHICLE

RELATED PATENT APPLICATION

This application claims the benefit of U.S. Provisional Patent Application No. 62/138,552 filed Mar. 26, 2015 entitled METHOD AND APPARATUS FOR THE TRANSPORTATION OF SPORTING AND RECREATIONAL EQUIPMENT ON A VEHICLE and which is hereby incorporated herein by reference in the entirety.

FIELD OF INVENTION

This invention relates to loading and transporting sporting and recreational equipment on a loading surface such as a roof or a truck bed of a vehicle and more specifically to the design and operation of an equipment carrier having a motorized winch, gridded platform, and rotating disk that provides for raising and lowering the sporting equipment onto and off of a vehicle for transport. The equipment carrier referred to herein as the "Quantum Transporter" with these unique features makes this objective, much less daunting of a task by removing the need to physically lift, raise and lower the equipment to and from the roof or truck bed of the vehicle.

BACKGROUND OF THE INVENTION

The present invention addresses a need of people that have to transport their cumbersome recreational and sporting equipment on a loading surface such as the roof or a truck bed of their vehicles. The sporting equipment can be any number of items, the most common being bicycles, kayaks, surf boards, and stand up paddle boards. Relatively new to the cycle market and what has become very popular for cyclist are three wheeled and recumbent bicycles. These units create an even greater challenge to transport because of the awkwardness of lifting, and/or the over the head stabilization required in holding the equipment until it can be firmly secured to the transport vehicle. The struggle is compounded when multiple pieces of equipment need to be secured to the vehicle.

The equipment carrier options on the market today are by design, very product specific. For example, some equipment carriers are designed to carry standard adult bicycles and have wheel trays that need to be moved and adjusted, to accommodate the different sizes and types of bicycles on the market today. For example, these carriers do not offer a way to transport the tag along wagons that attach to these bicycles for peoples' young children.

Almost all equipment carriers require lifting and raising the equipment to the loading surface such as the roof or truck bed of the vehicle. A particular challenge is transporting three wheeled bicycles where the simple prospect of raising the bicycle to the roof line is in itself is daunting. While there are products on the market to accomplish this, once your vehicle is set up with these carrier products you have no alternative to carry any other type of equipment, and you are still left with the task of manually lifting the bicycle, kayak or other recreational equipment to the roof, and securing it.

Other sports and recreational products typically transported on a roof top or truck bed of a vehicle are kayaks, canoes, surf boards, paddle boards, skis, snowboards and also toboggans. There are specific challenges with transporting each of these; basically because they all have very different foot prints which require a different securing method for each. What is needed is a universal equipment carrier that assists an operator to lift and secure the equipment to the vehicle.

SUMMARY OF THE INVENTION

The "Quantum Transporter" equipment carrier of the present invention has a mounting winch, a gridded platform, a rotating disk and a unique fully deployable carriage assembly that provides for all of the sporting equipment mentioned previously to be effortlessly mounted, and secured by any individual, regardless of their stature or strength. The carriage assembly of the present invention, provides for an operator to stand off to the side of the vehicle and release a locking pin that allows the carriage to be manually rotated on the rotating disk to deploy the carriage off of the side of the vehicle. Alternatively, a controller device operates a motor attached to the rotating disk to rotate the carriage assembly. The controller may also operate a winch to electrically lower the gridded platform off of the carriage assembly and down to the ground from the rear of the truck bed or from the roof and along the side of the vehicle. Alternatively, a winch or other attachment line may be manually operated. The platform is guided down deployment rails and once the platform is close to the ground collapsible wheels may be lowered to support the platform at an appropriate height for the operator and equipment. The operator has the option of disconnecting the winch line and rolling the platform to the sporting equipment such as into a body of water to secure a kayak to the platform. The gridded platform provides for straps or other fixtures to secure the equipment cargo to the platform and by reattaching the line and using the winch or other attachment line raise the platform with cargo along the deployment rails to the roof of the vehicle removing the requirements of lifting and holding the equipment to properly secure it to the vehicle.

The present invention is related to an equipment carrier for a vehicle comprising a frame attached to a loading surface such as a roof or truck bed of a vehicle; a rotating disk attached to the frame using braces; a carriage assembly affixed to the rotating disk, the carriage assembly having a platform; a winch having a cable attached to the platform; and wherein the carriage assembly is rotated, the platform is raised to an angle with respect to the loading surface of the vehicle, and the platform is lowered to the ground using the winch. The equipment carrier may comprise a locking pin to prevent rotation of the rotating disk. The equipment carrier may comprise at least one piston to hold the platform in the raised position at an angle with respect to the loading surface of the vehicle. The equipment carrier may comprise a cable fixture to secure the winch cable to the platform. The equipment carrier may comprise replaceable wheels attachable to the platform. The equipment carrier may comprise deployment rails that support the platform as it is being lowered. The equipment carrier may comprise a support tubes for storing the deployment rails when not in use. The equipment carrier may comprise a controller that electrically operates the winch. The equipment carrier may comprise a controller that electrically rotates the rotating disk. The equipment carrier may comprise a controller that electrically raises the platform to an angle.

The present invention is further related to a method of loading and transporting equipment on a loading surface such as a roof or truck bed of a vehicle, comprising the steps of attaching a frame to a loading surface of a vehicle; attaching a rotating disk to the frame; affixing a carriage assembly to the rotating disk, the carriage assembly having a platform; attaching a winch having a cable to the platform; raising the carriage assembly to an angle with respect to the loading surface of the vehicle; rotating the carriage assembly; and lowering the platform to the ground. The method of loading and transporting equipment on a loading surface such as a roof or truck bed of a vehicle may comprise locking the disk to prevent rotation. Within the method of loading and transporting equipment on a loading surface such as a roof or truck bed of a vehicle raising the carriage assembly may use at least one piston. The method of loading and transporting equipment on a loading surface such as a roof or truck bed of a vehicle may comprise securing the winch cable to the platform. The method of loading and transporting equipment on a loading surface such as a roof or truck bed of a vehicle may comprise attaching replaceable wheels to the platform. The method of loading and transporting equipment on a loading surface such as a roof or truck bed of a vehicle may comprise supporting the platform on the deployment rails as it is being lowered. The method of loading and transporting equipment on a loading surface such as a roof or truck bed of a vehicle may comprise storing deployment rails within platform support tubes when not in use. The method of loading and transporting equipment on a loading surface such as a roof or truck bed of a vehicle may comprise controlling the winch electrically. The method of loading and transporting equipment on a loading surface such as a roof or truck bed of a vehicle may comprise electrically rotating the disk. The method of loading and transporting equipment on a loading surface such as a roof or truck bed of a vehicle may comprise electrically raising the platform to an angle.

These and other features, advantages and improvements according to this invention will be better understood by reference to the following detailed description and accompanying drawings.

BRIEF DESCRIPTION OF DRAWINGS

Embodiments of the method and apparatus of the present invention will now be described by way of example only, with reference to the accompanying drawings in which:

FIG. 6A is a perspective view of an embodiment of the carriage assembly in a raised position and the support rack assembly affixed to a vehicle in an embodiment of the Quantum Transporter equipment carrier of the present invention;

FIG. 6B is a perspective view of an embodiment of the platform on the carriage assembly in a raised position and the support rack assembly affixed to a vehicle in an embodiment of the Quantum Transporter equipment carrier of the present invention;

FIG. 7A is an end view of an embodiment of the platform in an embodiment of the Quantum Transporter equipment carrier of the present invention;

FIG. 7B is a side view of an embodiment of the platform in an embodiment of the Quantum Transporter equipment carrier of the present invention;

FIG. 9 is a perspective view of an embodiment of a replaceable wheel and an embodiment of wheel attachment fixture with the platform in an embodiment of the Quantum Transporter equipment carrier of the present invention;

FIG. 10A is a perspective view of an embodiment of a replaceable wheel and an embodiment of wheel attachment fixture for the platform in an embodiment of the Quantum Transporter equipment carrier of the present invention;

FIG. 10B is a perspective view of an embodiment of a replaceable wheel and an embodiment of wheel attachment fixture for the platform in an embodiment of the Quantum Transporter equipment carrier of the present invention;

FIGS. 13A-13M are the deployment and loading of sporting equipment using an embodiment of the Quantum Transporter equipment carrier attached to the loading surface of a vehicle;

FIG. 14A a perspective view of an embodiment of the Quantum Transporter equipment carrier of the present invention.

DETAILED DESCRIPTION OF DRAWINGS

All the explanations and descriptions to follow will be consistent with use of the present invention on SUV's, Mini Vans, and Family Passenger Vans that have appropriate factory roof rack systems installed. Embodiments of the invention may further be used within the bed of a pickup truck, camper roof, or flatbed truck or trailer.

Figure 1:
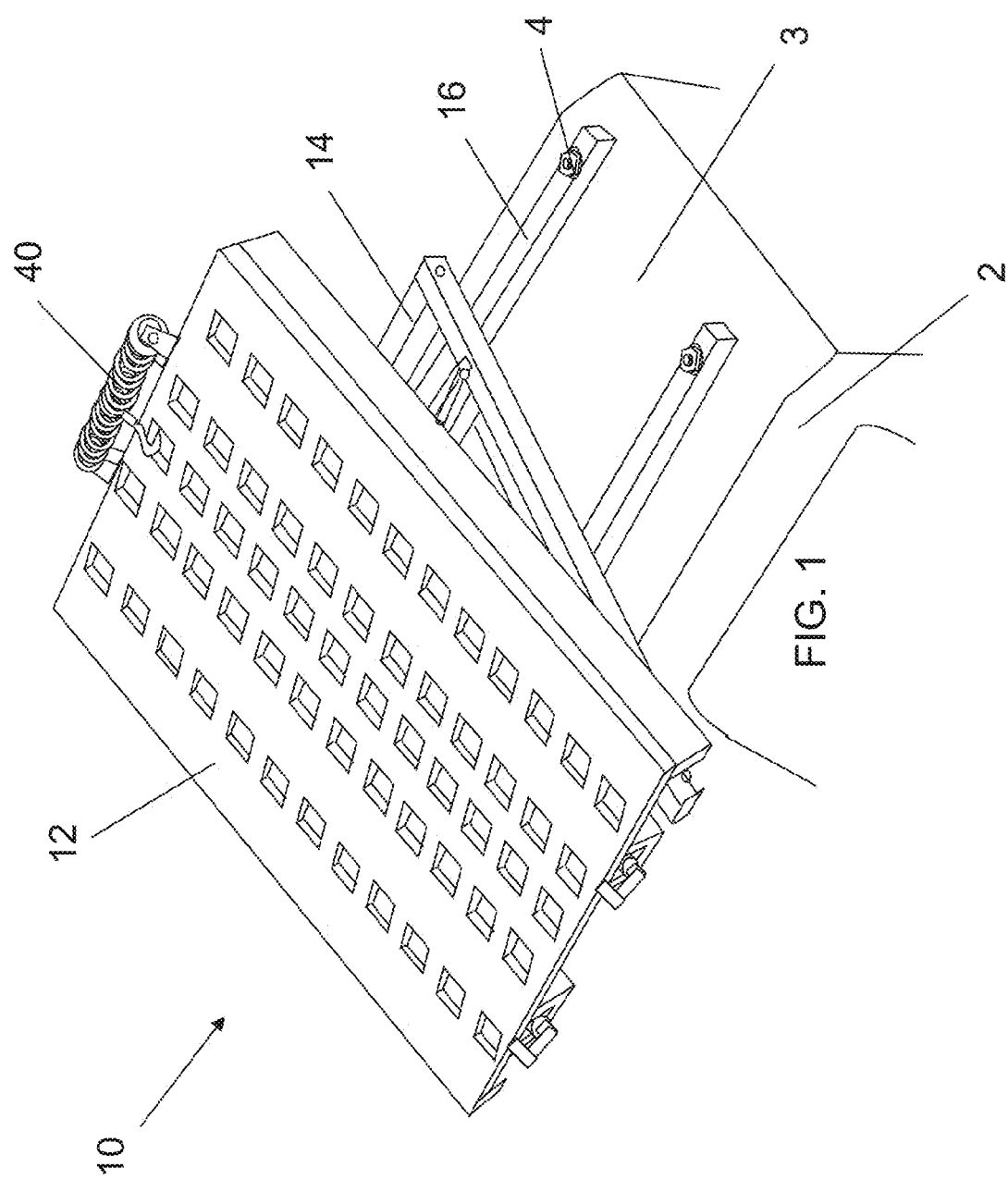
FIG. 1 is perspective view of an embodiment of the present invention referred to herein as the Quantum Transporter equipment carrier of the present invention with the platform rotated and lifted to raise or lower sporting equipment off of the side of a vehicle.
Figure 2:
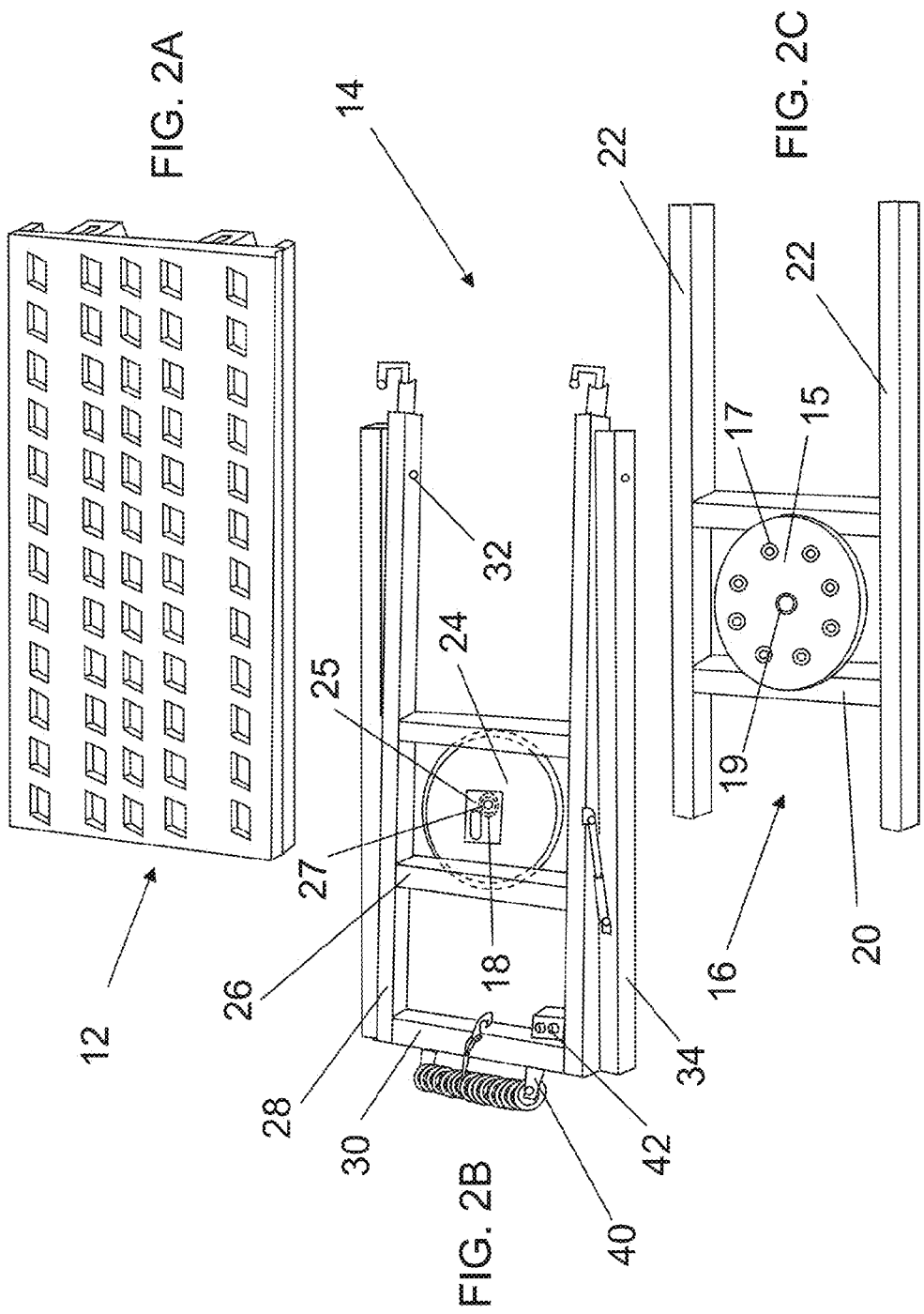
FIG. 2A is a perspective view of an embodiment of the platform in an embodiment of the Quantum Transporter equipment carrier of the present invention.
FIG. 2B is a perspective view of an embodiment of the carriage assembly in an embodiment of the Quantum Transporter equipment carrier of the present invention.
FIG. 2C is a perspective view of an embodiment of the support rack assembly in an embodiment of the Quantum Transporter equipment carrier of the present invention.
Figure 3:
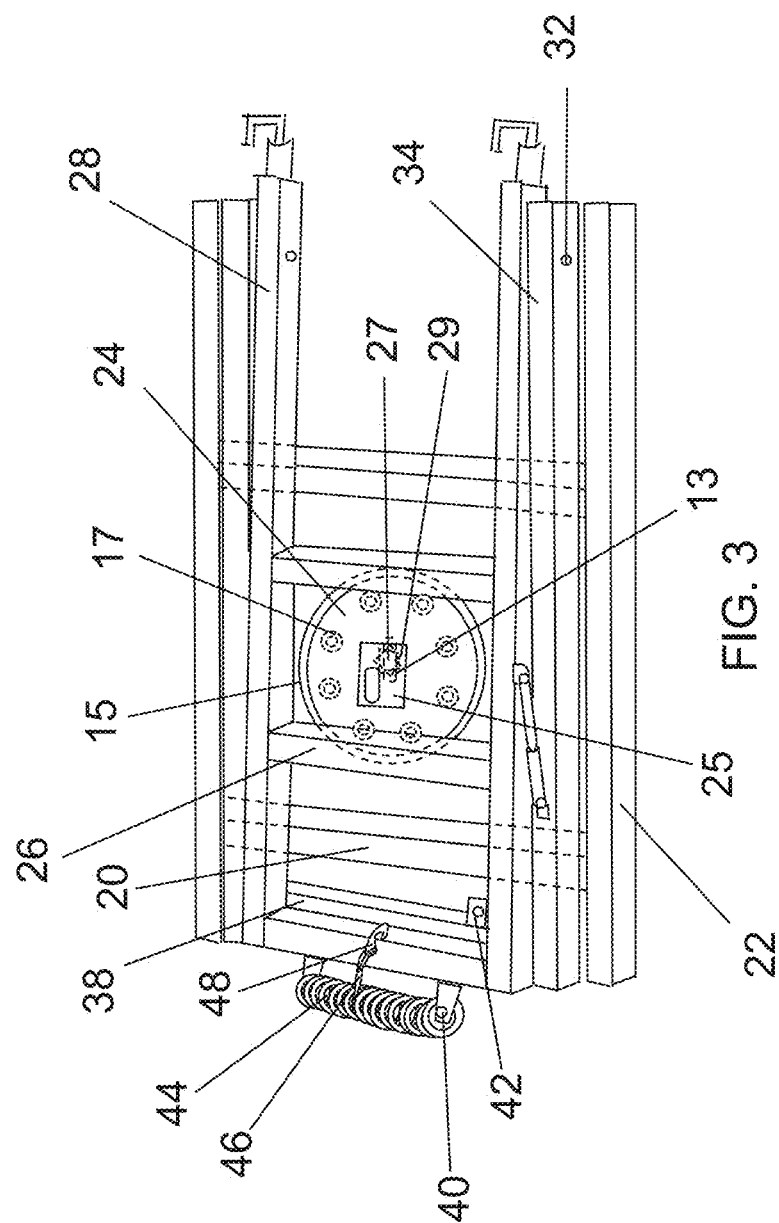
FIG. 3 is a perspective view of an embodiment of the carriage assembly in a lowered position and the support rack assembly in an embodiment of the Quantum Transporter equipment carrier of the present invention.

The present invention as shown in FIG. 1 is an equipment carrier 10 referred to herein as the "Quantum Transporter" that provides for a platform 12 that can transport sporting equipment to be rotated and lowered from the loading surface such as the roof 3 of a vehicle 2 to the ground. The equipment carrier 10 is attached to the vehicle 2 using bolts 4 or other attachment mechanisms as prescribed by the roof rack and vehicle specifications recommended by the vehicle manufacturer. The Quantum Transporter equipment carrier 10 comprises three component assemblies, the platform assembly 12, as shown in FIG. 2A, a carriage assembly 14, as shown in FIG. 2B, and a base support assembly 16, as shown in FIG. 2C. The components of the equipment carrier 10 may be made from aluminum or polyvinyl chloride (PVC) square or round tubing or other structurally similar and light materials to reduce the overall weight on the roof 3 of the vehicle 2. In an embodiment, the base support assembly 16 has two rack support members 20 that may be partially curved in order to extend across the roof 3 and properly align the equipment carrier 10 to the vehicle 2. The rack support members 20 are attached to frame members 22 that extend along the sides of the roof 3 of the vehicle 2. The frame members 22 attach the Quantum Transporter equipment carrier 10 to the roof rack of a vehicle 2. Attached between the rack support members 20 is a turntable 15 made of metal or a composite material. The turntable 15 has an opening 19 that is aligned with an opening in the center of a rotating disk 24 of the carriage assembly 14. The rotating disk 24 extends between two braces 26 with the disk 24 welded or otherwise permanently attached to the bottom of the braces 26. The braces 26 are attached to carriage frame members 28 that at one end are connected together using an upper frame piece 30. A motor 25 is affixed on or near the rotating disk 24 with a motor shaft 27 having one or more gears 29 to interlock with one or more gears within the opening 18 of the rotating disk 24 as shown in FIG. 3. The motor shaft 27 extends through the turntable opening 19 and a pin 13 or other attachment fixture to secure the shaft 27 below the turntable 15 to provide for the motor 25 when actuated to spin the rotating disk 24 from a carrier position parallel with the length of the vehicle 2 to a loading and/or unloading position perpendicular to the vehicle 2. Transfer bearings 17 may be positioned between the mating surfaces of the turntable 15 and rotating disk 24 to reduce friction and assist in freely spinning the rotating disk 24.

Figure 4:
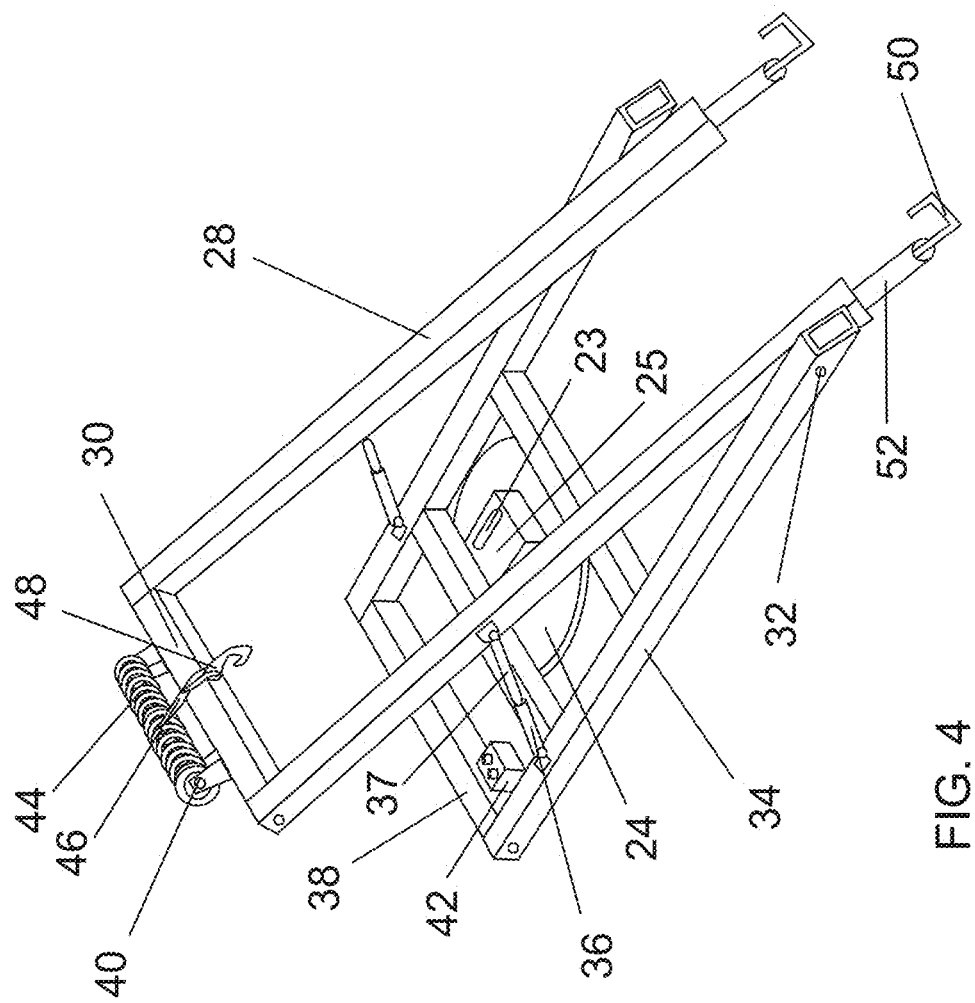
FIG. 4 is a perspective view of an embodiment of the carriage assembly in an embodiment of the Quantum Transporter equipment carrier of the present invention in a raised position.

As shown in FIG. 4, the frame members 28 are affixed using pivot pins 32 to supports 34 that with an upper support 38 form the carriage assembly support structure. The platform 12 is lowered from the roof 3 of the vehicle 2 to the ground using a manual or motor driven winch 40 that is attached along the upper frame piece 30. The pivot pins 32 allow for the carriage assembly 14 to be lifted and be rotated up from the supports 34 to a maximum angle of approximately 30° so that once lifted, locking pistons 36 with extension members 37 hold the carriage assembly 14 in place at an appropriate angle to provide for the platform 12 to be lowered from the roof 3 of the vehicle 2. A motor driven winch 40 and the motor 25 may be powered using a power extension lead from the battery of the vehicle. Alternatively, a power supply 42 may be mounted along the upper support 38 that connects the two supports 34. The power supply 42 may power one or both of the motor 25 for the rotating disk 24 and the winch 40. The power supply 42 may also provide power for a hydraulic system to raise and lower the carriage assembly 14 using hydraulic pistons 36. The winch line 44 may be cable or nylon webbing of sufficient strength to secure the platform 12 with an attachment clip 48 secured to an end 46 of the line 44. The attachment clip 48 is removable so that once lowered, the platform 12 may be detached from the winch line 44. The motor 25 may have a release handle 23 that may be actuated to release the gears 29 and allow the carriage assembly 14 to be moved. The release handle 23 may further have a setting to provide for the carriage assembly 14 to be manually rotated in the event there is for example a failure of the motor 25.

Figure 5A:
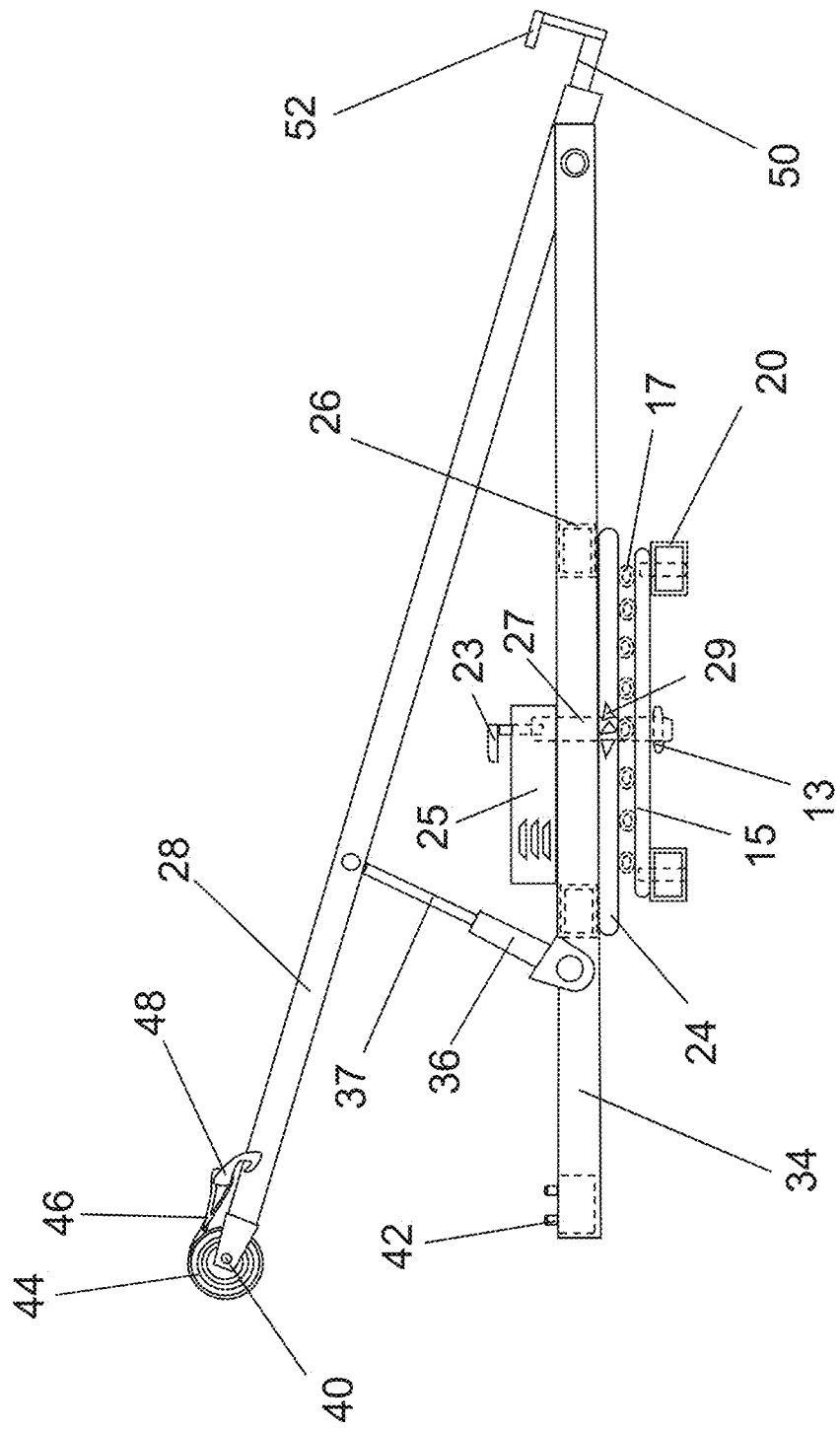
FIG. 5A is a side elevation view of an embodiment of the carriage assembly in an embodiment of the Quantum Transporter equipment carrier of the present invention in a raised position.
Figure 5B:
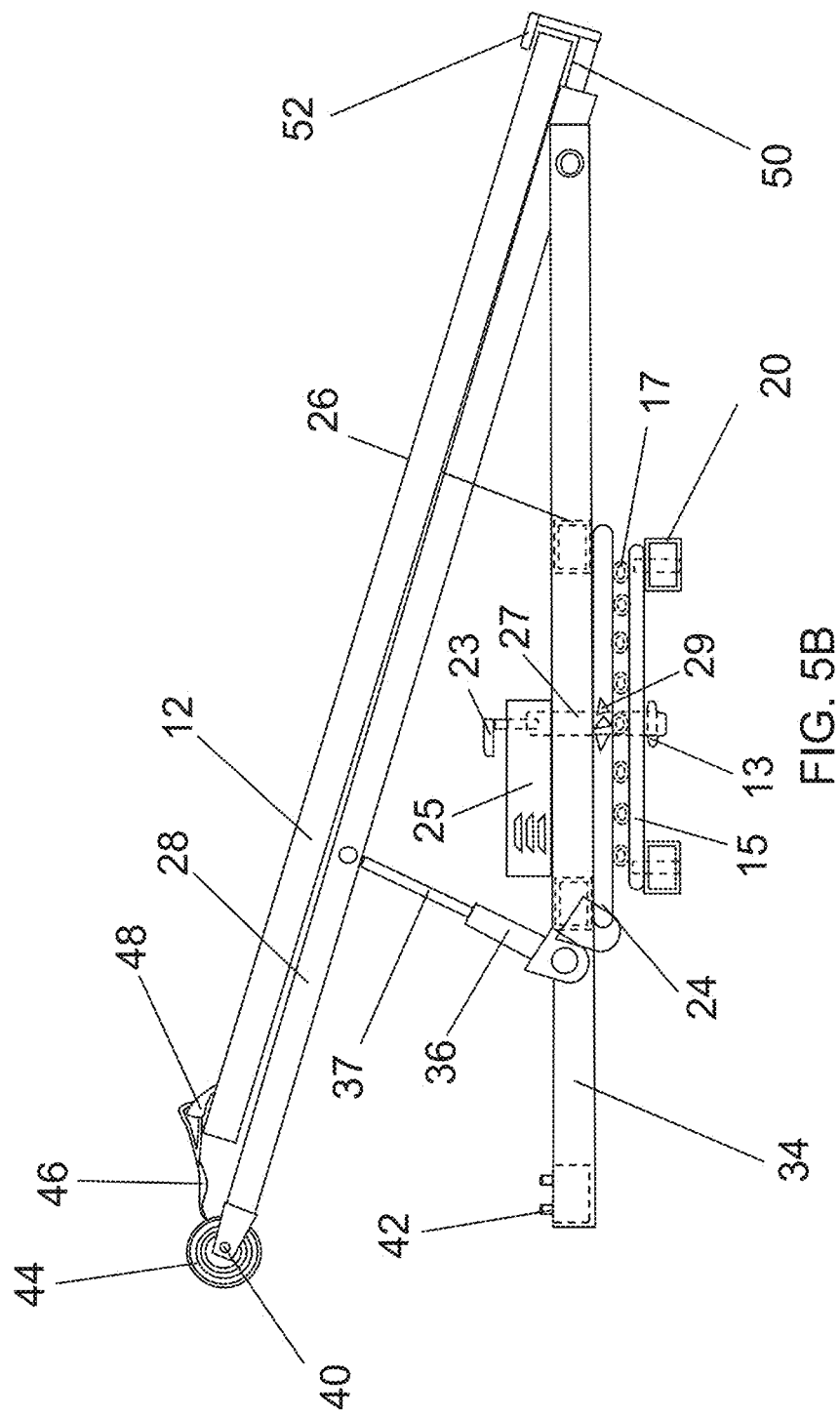
FIG. 5B is a side elevation view of an embodiment of the carriage assembly and the platform in an embodiment of the Quantum Transporter equipment carrier of the present invention in a raised position.

In a raised position, the platform 12 is secured using the winch line 44 and further prevented from sliding using rotatable clamps 50 that are affixed to the end of deployment rails 52, as shown in FIG. 5A. The platform 12 is secured to the carriage assembly 14 using the winch line hook 48 and the rotatable clamps 50 as shown in FIG. 5B. The carriage assembly 14 in a raised position is shown affixed to the base support 16 that is affixed to a vehicle 2 in FIG. 6A. The Quantum Transporter equipment carrier 10 is shown with the platform 12 in FIG. 6B and is shown with the platform 12 deployed along the deployment rails 52 in FIG. 6C. The platform 12 may be fully deployed by folding down wheels 60 to support the platform 12 on the ground, as shown in FIG. 7A. The clamps 52 are then rotated to provide for the platform 12 to be slid off of the deployment rails 52 and be rolled along the ground on the wheels 60. The deployment rails 52 may be held within square or round support tubes 53 that are affixed to the base of the platform 12.

Figure 11A:
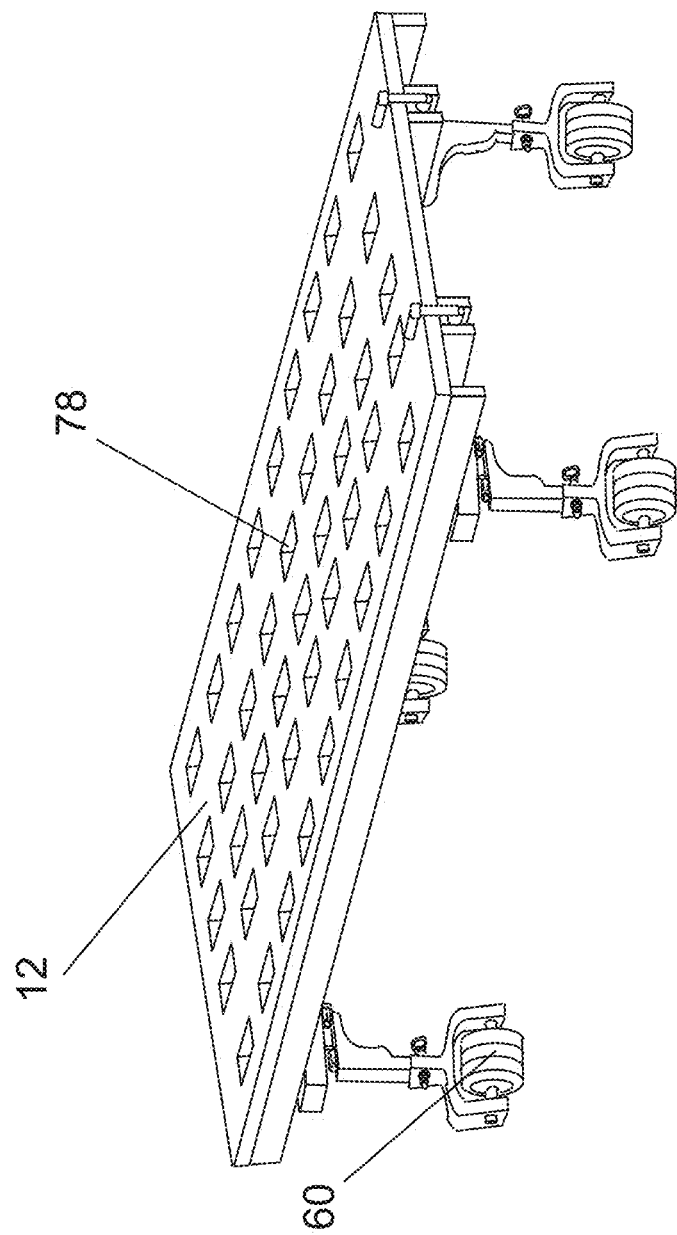
FIG. 11A is a perspective view of an embodiment of a platform in an embodiment of the Quantum Transporter equipment carrier of the present invention.
Figure 11B:
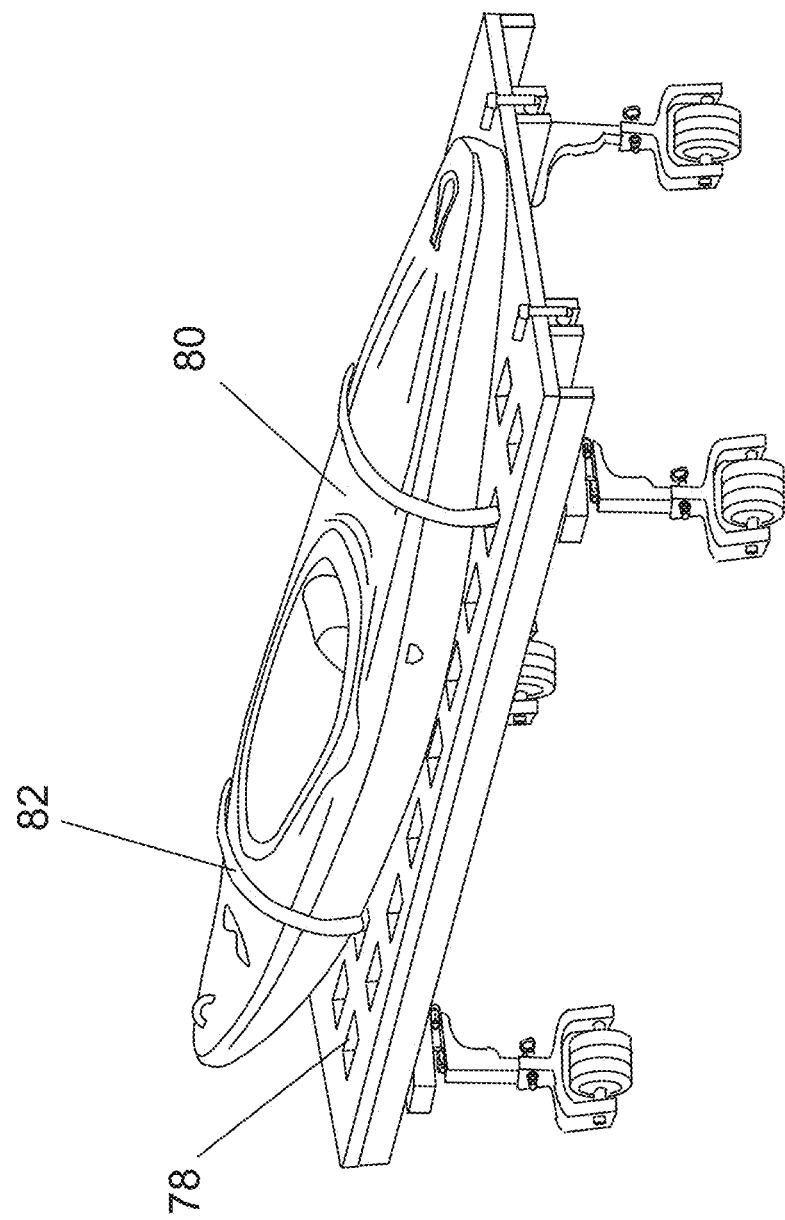
FIG. 11B is a perspective view of an embodiment of platform with a piece of sporting equipment in an embodiment of the Quantum Transporter equipment carrier of the present invention.

The wheels 60 may be attached to wheel mounts 62 at an axle 64 with the wheel mount 62 affixed to a bracket 66 that is attached to the base of the platform 12. In further embodiments, as shown in FIG. 7B, a slide 68 with a runner 70 affixed to the wheel mount 64 may assist in folding and aligning the wheels 60 below the platform 12. The wheel brackets 66 may be removable from the platform 12 using pegs 72 that are mounted to a beam 73 affixed to the base of the platform 12. The wheel bracket 66 may have cylinders 74 that are slid on to the pegs 72 with the pegs 72 providing for the wheel bracket 66 to pivot on the pegs 72 and be pushed against the base of the platform 12 as shown in a rear perspective view in FIG. 8. A clip 76 may be provided to secure wheel mount 64 or bracket 66 to the platform 12 when the wheel 60 is rotated into an up position as shown in FIG. 9. The wheels 60 may be removable from the wheel bracket 66 using a screw 76 or other attachment fixture as shown in FIG. 10A to provide for wheels of different dimensions to be installed in order to maneuver the platform 12 on different types of terrain, such as larger and/or thicker wheels for sand, gravel, grass or other surfaces. By detaching the screw 76 as shown in FIG. 10B, the wheel mount 64 may be removed and replaced with another wheel mount 64 having an appropriate tread and size to easily roll the platform 12 with sporting equipment along the ground. The platform 12 may further be capable of floating based on the material used to form the platform or in further embodiments by attaching one or more pontoons or other floatable devices to the platform 12. As shown in FIG. 11A, the platform has a series of openings 78 in the form of a grid that provides for the attachment of any type of sporting equipment such as one or more bicycles and/or a tag along wagon, surfboards, or other sporting equipment such as a kayak 80 as shown in FIG. 11B. Any number of straps 82 of webbing, cable or other material as necessary may be inserted through the openings 78 and be attached around the sporting equipment to secure the equipment to the platform 12.

Figure 6C:
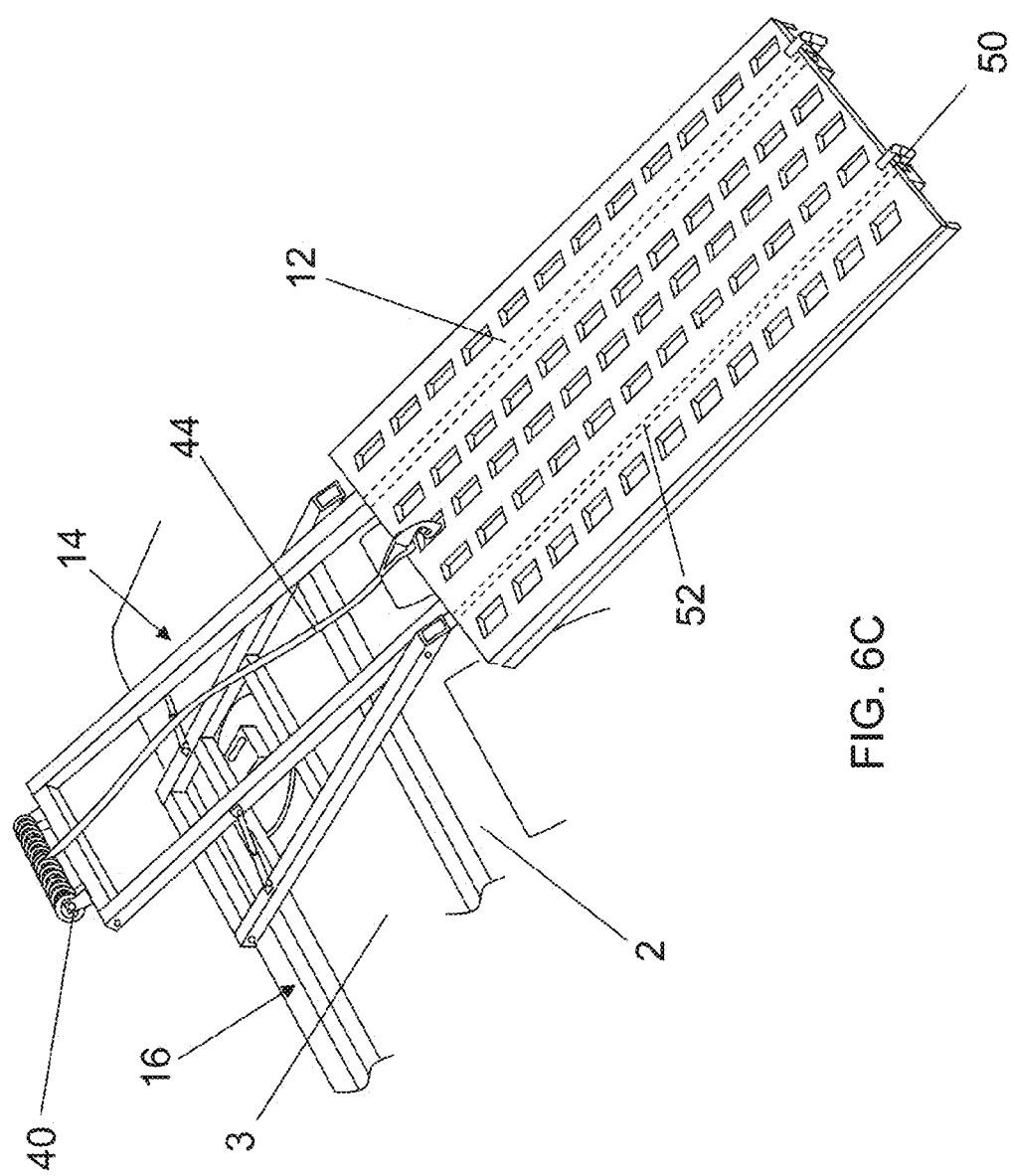
FIG. 6C is a perspective view of an embodiment of the platform being lowered from the carriage assembly and the support rack assembly affixed to a vehicle in an embodiment of the Quantum Transporter equipment carrier of the present invention.

The loading operation of the "Quantum Transporter" equipment carrier 10 begins by first rotating the carriage assembly 14 to the desired side of the car to deploy the platform 12, as shown in FIG. 6B. To accomplish this, the operator may first actuate the handle 23 to turn on the motor 25 to move the rotating disk 24 on the turntable 15. In further embodiments, a remote control (not shown) may be used to control the motor 25 and winch 40. Once the carriage assembly 14 is fully rotated, the handle 23 may be adjusted to lock the rotating disk 24 in place. The carriage assembly 14 can be rotated to either side of the vehicle 2. Once the carriage assembly 14 is directed to the side of the vehicle 2 and locked into place, the operator manually or electronically raises the carriage assembly 14 to an angle of from about 15° to 45° and preferably approximately 30° where the pistons 36 may be partially or fully extended. The platform 12 deployment is accomplished, by the operator using the remote control to control the winch 40 to electronically lower the platform 12 off of the carriage assembly 14. As the platform 12 is lowered the deployment rails 52 are pushed by the platform 12 to extend and guide the platform 12 along the deployment rails 52 as shown in FIG. 6C and be slowly lowered to the ground. As the platform 12 is lowered the collapsible wheels 60, shown in FIG. 11A, can be released and folded down to support the platform 12. The operator may then rotate the deployment rails 52 to provide for the platform 12 to be slid off of the rails 52. In an embodiment, the wheels 60 may be small in size with a short support bracket 66 so that when the bracket 66 is fully extended the platform 12 is only approximately 4 to 6 inches off of the ground so that the platform 12 is low enough for an operator to have to lift any type of sporting equipment only a small amount to put the equipment on the platform. A particular advantage for individuals with back or other health problems that have difficulty lifting.

Once the platform 12 is on the ground supported on the wheels 60, the operator has the option of disconnecting the winch line 44 and rolling the platform 12 to an area where the cargo can safely and comfortably be secured to the platform 12. For example for a kayak 80, the operator may roll the platform 12 into a body of water and the kayak 80 can easily be floated on to the platform 12 and be secured. With the cargo positioned on the platform 12, the operator can secure the cargo by affixing straps 82 of cable, webbing, or other material around the cargo and inserting the ends of the straps 82 through and number of openings 78 in the platform grid. The straps 82 or other appropriate drop in implements such as clamps or clips may be semi-permanently attached to the platform 12 to be available to extend through or around the cargo to affix the equipment to the platform 12. The multiple opening 82 in the platform 12 are a key to the simplicity and versatility of the "Quantum Transporter" 10 with these openings 82 providing anchor points at a number of locations to strategically position one or more pieces of equipment anywhere on the platform 12. Once the cargo is secured in place, the winch line 44 may then be re-attached and the platform 12 pulled out for example of the water with the kayak as cargo as shown in FIG. 11B.

Figure 8:
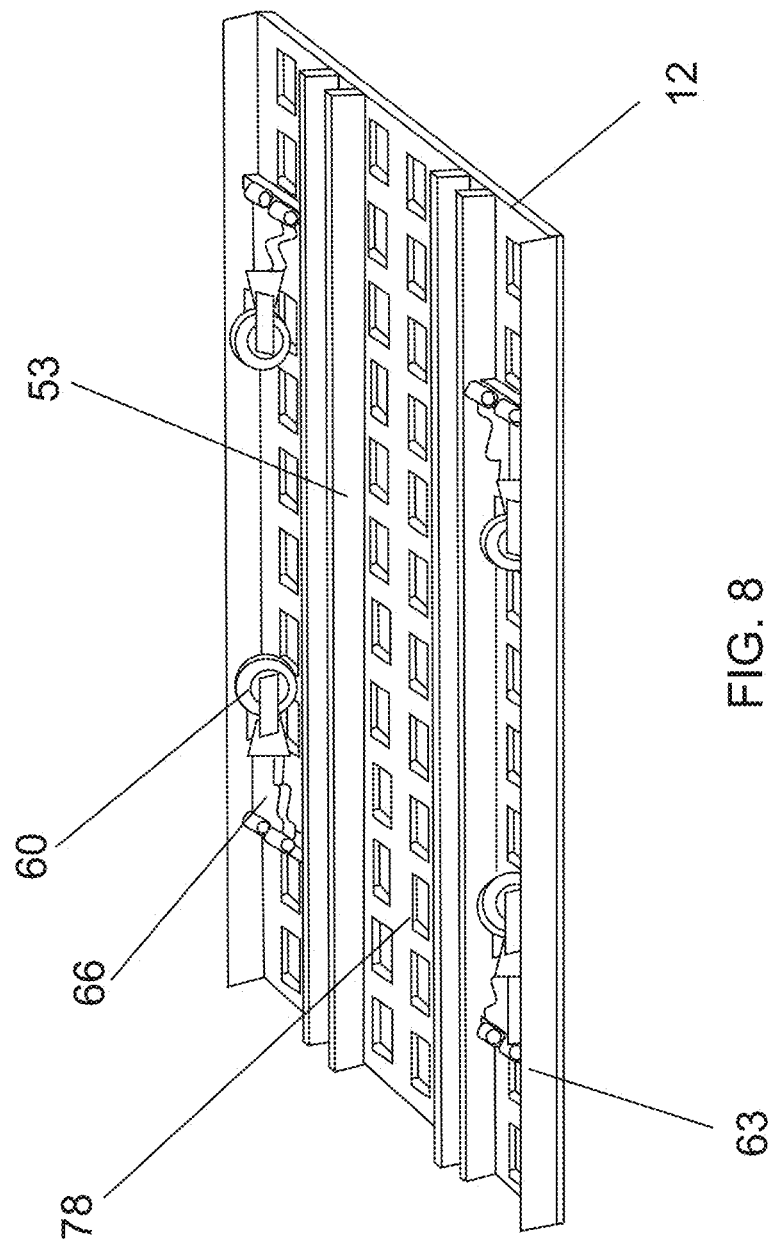
FIG. 8 is a bottom perspective view of an embodiment of the platform in an embodiment of the Quantum Transporter equipment carrier of the present invention.

At this point the operator will roll the platform 12 back to the proximity of the vehicle 2. The winch line 44 will then be reattached using the attachment clip 48 and the platform 12 will be maneuvered to be aligned with the deployment rails 52 so that the rotatable clamps 50 can be rotated up to lock the platform to the rails 52. The wheels 60 may be closed and fold completely up and under the platform 12 as shown in FIG. 8 so that the wheels 60, wheel mounts 64 and support brackets 66 minimally extend below the walls 63 of the platform 12, so the platform sits flat on the carriage assembly 14.

Figure 12:
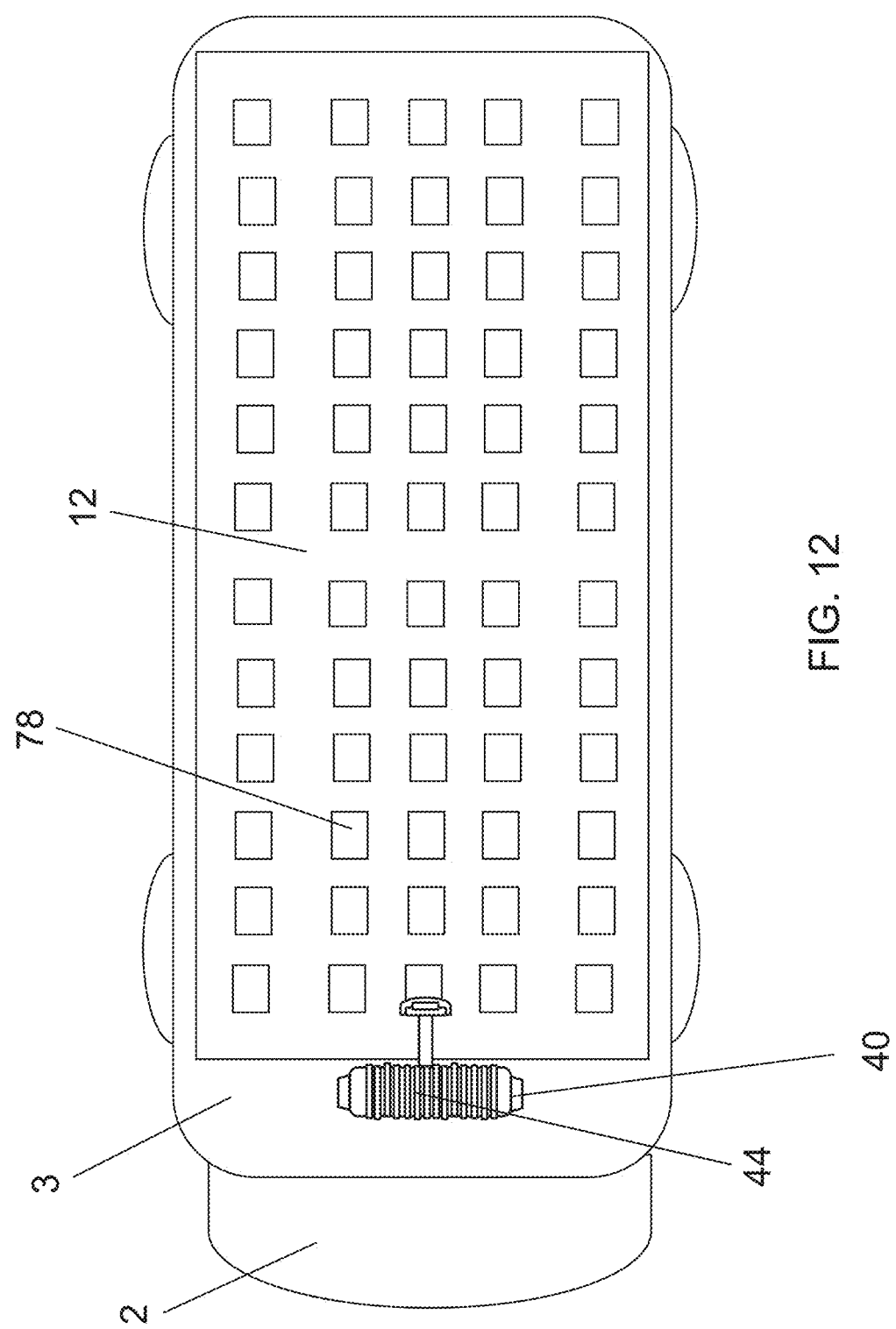
FIG. 12 is a top view of an embodiment of the platform in an embodiment of the Quantum Transporter equipment carrier of the present invention attached to a vehicle.

The platform 12 is retracted by having the operator press a button, knob or other actuator on the remote control (not shown) to start the winch 40 and retract the line 44 to pull the platform 12 up with the deployment rails 52 being pulled into the support tubes 53 as the platform 12 is safely hoisted up along the rails 52 and is properly seated onto the carriage assembly 14. The deployment rails 24 and platform 12 are pulled up to a point where the winch line 44 is fully retracted. The winch 40 may then automatically stop and using the remote control, the carriage assembly 14 can be lowered from the deployment angle to a closed position. The motor 25 may then be actuated using the remote control to turn the rotating disk and align the carriage assembly with the platform 12 with the base support 16 along the length of the vehicle 1 as shown in a top view in FIG. 12.

Figure 13A:
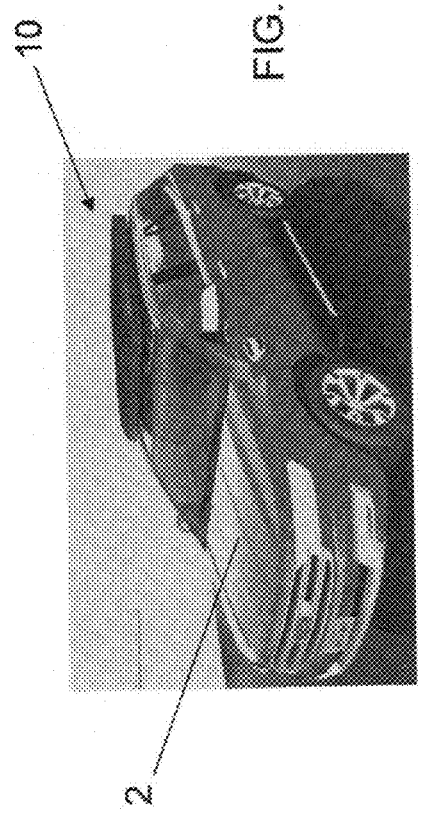
Figure 13C:
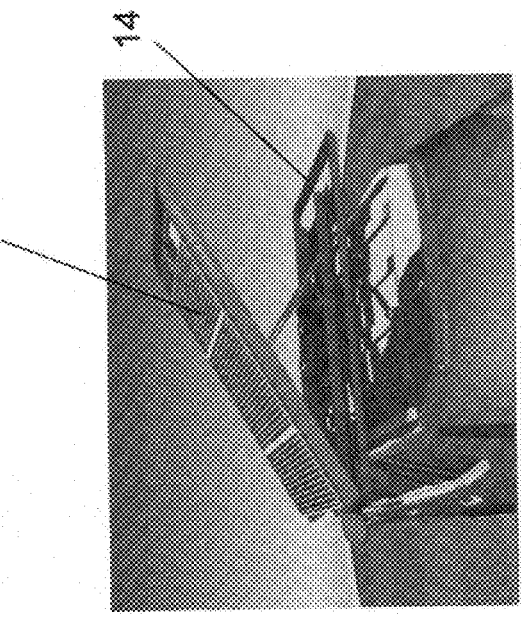
Figure 13B:
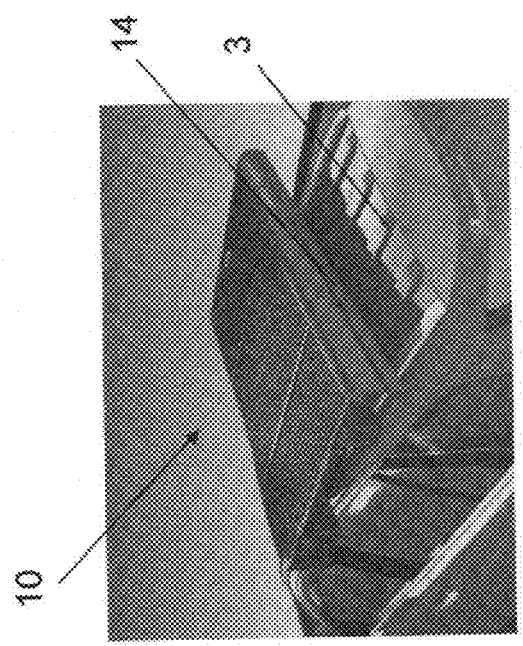
Figure 13F:
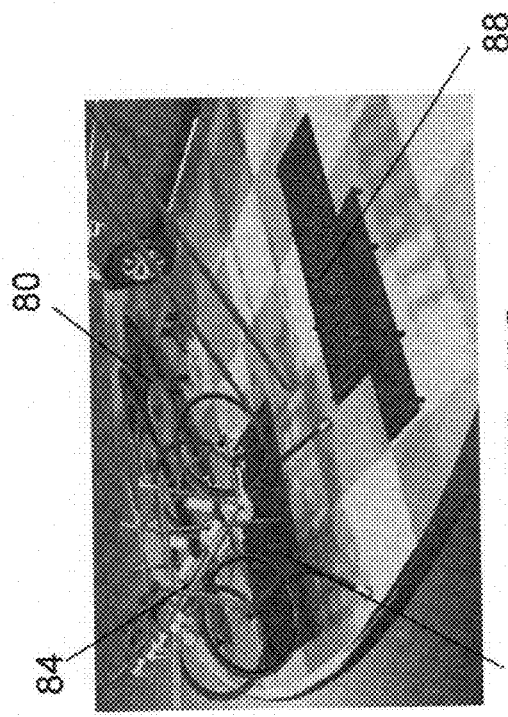
Figure 13G:
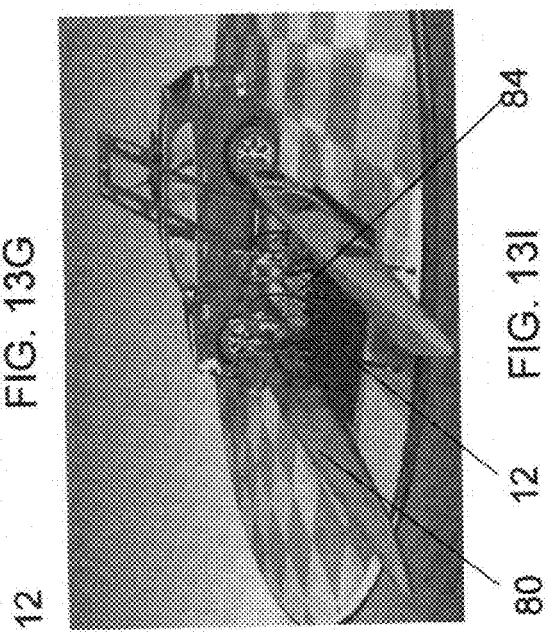
Figure 13H:
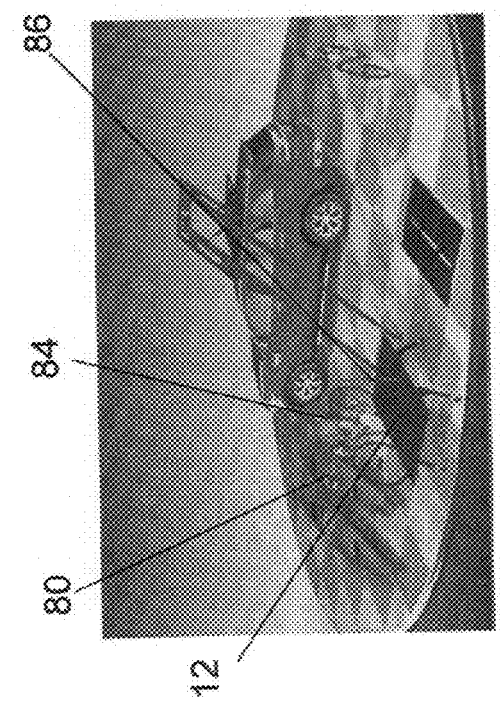
Figure 13I:
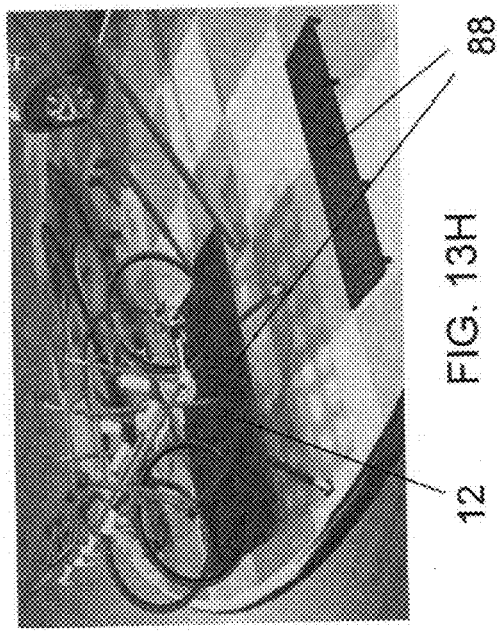

The steps of deployment, loading and transporting any sporting equipment to the loading surface such as a roof 3 of a vehicle 2 is shown in FIGS. 13A-13M with FIG. 13A showing the Quantum Transporter equipment carrier 10 in a closed position without cargo affixed the roof 3 of a vehicle 2. The carriage assembly 14 of the Quantum Transporter equipment carrier 10 is rotated as shown in FIG. 13B and the platform 12 is raised as shown in FIG. 13C. The platform 12 affixed to the winch line 44 is slowly lowered along the deployment rails 52 using the winch 40 as shown in FIG. 13D. Support brackets 66 may be lowered to extend wheels 60 to support the platform 12 on the ground. Alternatively, the wheels 60 may be separate from the support brackets 66 and be selected appropriately for the terrain and then be attached to the support brackets 66, as shown in FIG. 13E. Once the platform 12 is on the ground and supported, a bike 84 or other type of sporting equipment may be secured to the platform 12 using pole supports 86, as shown in FIG. 13F, brackets, or other attachment fixtures. In other embodiments, as shown in FIG. 13G, extension platforms 88 may be attached to the platform 12 to extend the surface area for attachment and provide for additional sporting equipment to be loaded such as one or more kayaks 80 as shown in FIGS. 13H and 13I. The platform 12 with the bikes 84 and kayaks 80 is then pulled along the deployment rails 52 to the roof 3 of the vehicle 2 using the winch 40 as shown in FIGS. 13J and 13K. The platform 12 is rotated on the roof 3 of the vehicle 2 as shown in FIG. 13L and the vehicle 2 with the sporting equipment is ready for transport as shown in FIG. 13M.

Figure 14B:
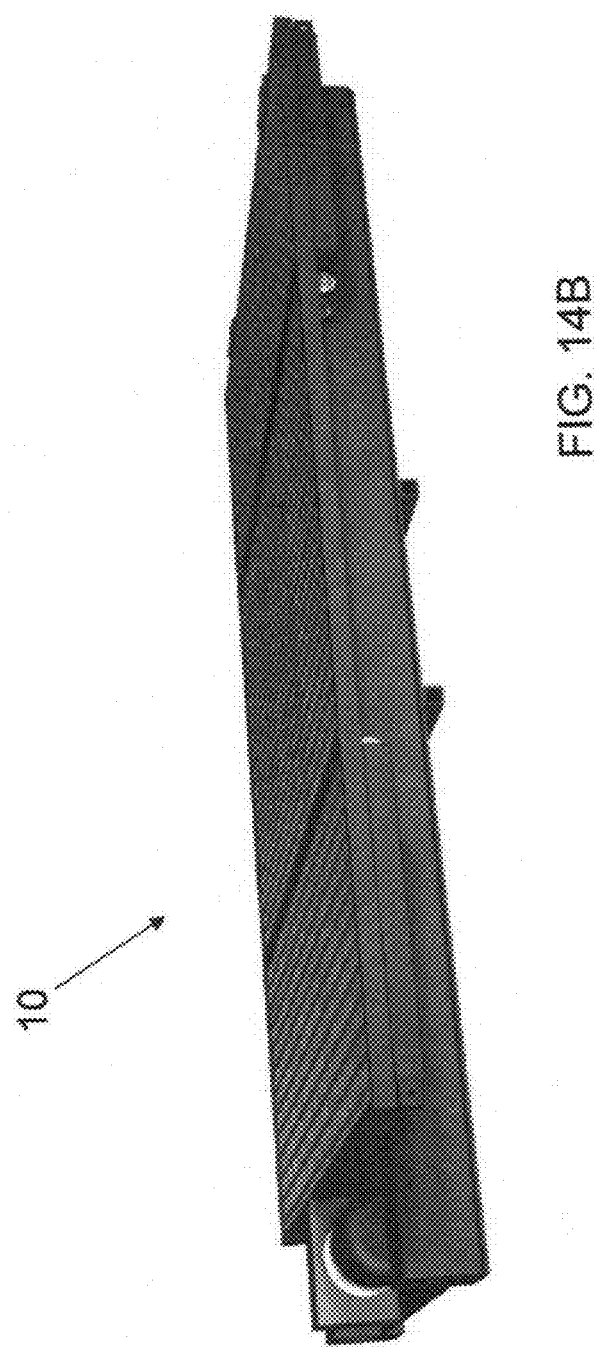
FIG. 14B a perspective view of an embodiment of the Quantum Transporter equipment carrier of the present invention without ferrings.

An embodiment the Quantum Transporter equipment carrier 10 is shown in FIG. 14A. The carriage assembly 14 is aligned on the frame members 28 with ferrings 90 covering the frame members 28 to provide a sleek, aerodynamic low profile design to reduce wind resistance when transporting sports equipment on a moving vehicle 2. This embodiment of the Quantum Transporter equipment carrier 10 is shown without ferrings 90 in FIG. 14B. the Quantum Transporter equipment carrier 10 provides an important and useful solution to those individuals without sufficient strength or ability to lift and maneuver awkward and heavy sporting and recreational equipment onto a vehicle. The Quantum Transporter equipment carrier 10 also provides for multiple pieces of equipment to be attached to the platform 12 so that anyone can easily load, transport, and off load the equipment for exercise and enjoyment anywhere.

The invention has been described in detail with particular reference to certain preferred embodiments thereof, but it will be understood that variations and modifications can be effected within the spirit and scope of the invention.

What is claimed is:

1. An equipment carrier for a vehicle, comprising:
a frame attached to a loading surface of the vehicle;
a turntable attached to the frame;
a shaft extending through the turntable and through a rotating disk, the shaft configured to spin the rotating disk;
a carriage assembly affixed to the rotating disk, the carriage assembly configured to be rotated by the rotating disk;
the carriage assembly comprising:
at least one support affixed to the rotating disk;
at least one carriage frame member pivotally affixed to the at least one support;
at least one pivot pin inserted through the at least one support affixed to the rotating disk and through the at least one carriage frame member to pivotally affix the at least one carriage frame member to the at least one support;
at least one piston configured to lift the at least one carriage frame member at an angle up from the at least one support;
a platform configured to be lifted by the carriage frame member and be detachable from the carriage assembly;
a cable attached to the platform; and
wherein the carriage assembly is rotated, the platform is lowered to the ground using the cable, equipment is secured to the platform and the platform is raised to the loading surface of the vehicle; and
wherein the angle of lift of the at least one carrier frame member is between 15° and 45°.

2. The equipment carrier of claim 1 comprising a locking pin to prevent rotation of the rotating disk.

3. The equipment carrier of claim 1 wherein the at least one piston holds the platform in a raised position at an angle with respect to the loading surface of the vehicle.

4. The equipment carrier of claim 1 comprising a cable fixture to secure the cable to the platform.

5. The equipment carrier of claim 1 comprising replaceable wheels attachable to the platform.

6. The equipment carrier of claim 1 comprising deployment rails that support the platform as it is being lowered.

7. The equipment carrier of claim 6 comprising support tubes affixed to the base of the platform for storing the deployment rails when not in use.

8. The equipment carrier of claim 1 comprising a controller that electrically operates a winch attached to the cable.

9. The equipment carrier of claim 1 comprising a controller that electrically rotates the rotating disk.

10. The equipment carrier of claim 1 comprising a controller that electrically raises the platform to an angle.

11. The equipment carrier of claim 1 comprising collapsible wheels attached to the platform and that in a first position are folded down to support the platform and in a second position are folded up and under the platform so that the platform sits flat on the carriage assembly.

12. The equipment carrier of claim 1 wherein the platform comprising a plurality of openings in the form of a grid.

13. A method of loading and transporting equipment on a loading surface such as a roof or truck bed of a vehicle, comprising the steps of:
providing the equipment carrier for a vehicle of claim 1;
rotating the carriage assembly;
lowering the platform to the ground;
securing equipment to the platform;
raising the platform to the loading surface of the vehicle.

14. The method of loading and transporting equipment on a loading surface such as a roof or truck bed of a vehicle of claim 13, comprising locking the disk to prevent rotation.

15. The method of loading and transporting equipment on a loading surface such as a roof or truck bed of a vehicle of claim 13, comprising raising the carriage assembly to an angle with respect to the loading surface of the vehicle.

16. The method of loading and transporting equipment on a loading surface such as a roof or truck bed of a vehicle of claim 13, comprising affixing the cable to a winch and operating the winch to raise or lower the platform.

17. The method of loading and transporting equipment on a loading surface such as a roof or truck bed of a vehicle of claim 16, comprising controlling the winch electrically.

18. The method of loading and transporting equipment on a loading surface such as a roof or truck bed of a vehicle of claim 13, comprising attaching replaceable wheels to the platform.

19. The method of loading and transporting equipment on a loading surface such as a roof or truck bed of a vehicle of claim 13, comprising supporting the platform on deployment rails as it is being lowered.

20. The method of loading and transporting equipment on a loading surface such as a roof or truck bed of a vehicle of claim 16, comprising storing the deployment rails within support tubes when not in use.

* * * * *